UNITED STATES PATENT OFFICE 2,624,758

SUBSTITUTED MONO ARALKYL ALKYLENE
POLYAMINO POLYACETIC ACIDS

Frederick C. Bersworth, Verona, N. J.

No Drawing. Application November 1, 1950,
Serial No. 193,544

3 Claims. (Cl. 260—518)

This invention relates to chelating agents for metal ions in aqueous solution and has for its object the provision of a substituted alkylene polyamino polyacetic acid metal ion chelating agent which possesses strong bactericidal and fungicidal properties.

Another object is to provide a germicidally active metal ion chelating agent for use in aqueous solutions having a wide range in pH values.

A further object is to provide such a metal ion chelating agent which will chelate alkaline earth metal and magnesium ions in aqueous solutions.

Other objects will be apparent as the invention is more fully hereinafter disclosed.

In accordance with these objects I have discovered that when one of the amino hydrogens of an alkylene polyamine conforming to the structural formula:

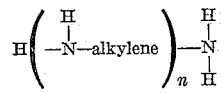

where $n$ is an integer of from 1 to 5 is displaced by an alkylene group containing from 1 to 5 carbon atoms in which is substituted a halogenated phenyl group and the remaining amino hydrogens are replaced by acetic acid salt groups, the resulting compound is water soluble and is a good chelate forming compound for metal ions in aqueous solutions and that the halogenated phenyl group imparts germicidal and fungicidal properties to the compound and to the chelates of the compound which markedly enlarge the utility of the compound in the arts of washing, cleaning, laundering, etc.

The compounds of the present invention accordingly conform to the general structural formula:

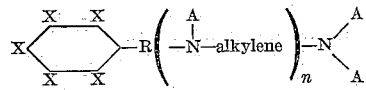

wherein $n$ is a positive integer of from 1 to 5; X is one of the group consisting of hydrogen, alkyl, alkoxyl, hydroxyl, and halogen with at least one X group but not more than three of the X groups being halogen; R consists of a divalent alkylene group of from 1 to 5 carbon atoms on which the phenyl group is substituted; and A is acetic acid or propionic acid.

Moreover, the effectiveness of the compound both as a chelating agent and as a germicidal agent extends over a wide pH range, particularly as the number of carboxylic groups in the alkylene polyamine increases.

Such amino carboxylic groups increase the solubility of both the chelating agent and the metal chelate compound, as well as increasing the tendency for combination with metal ions.

The increase in alkylene chain represented by R results in an unusual alteration in properties. When no R group is present and $n=1$, the phenyl group seems to prevent strong chelation particularly with alkaline earth ions. When R= —CH$_2$—, the tendency for chelation is surprisingly high. Such compounds have a strong affinity for transition metals, heavy metals and alkaline earth and rare earth metal ions. As the length of the R chain is further increased the stability of the chelates is somewhat decreased, but still remains high, indicating that the phenyl and amino acid groups act essentially independently. Thus two independent functions may be obtained in the same molecule—the bactericidal effect of the substituted phenyls and the sequestering action of the amino acid groups.

As specific examples of the compounds within the broad scope of the present invention, but not as a limitation of the same, the following examples are given:

Example I

One mol of (p-chlorophenyl)-n-pentyl amine is treated in 50% aqueous ethanol at reflux with one mole of chloroethylamine diacetic acid disodium salt ClCH$_2$CH$_2$N(CH$_2$·COONa)$_2$. An aqueous solution of the amino acid salt is gradually added over a period of 2 hours and heating and stirring are continued for two hours thereafter. The alcoholic solution is alkalized to pH 10 with caustic soda and treated with one mole of NaCN and one mole of formaldehyde per amino hydrogen remaining in the compound according to the process described in my Patent #2,387,735, to carboxymethylate the compound and the resulting solution after acidification and evaporation of solvent yields a crystallizable product having the formula:

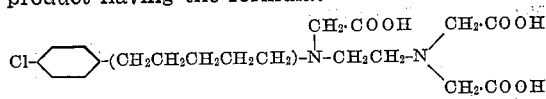

This acid compound is slightly soluble in water but its salts are very soluble in water and are stable over a wide pH range.

Example II

To a solution of at least 3 moles of ethylene diamine in form of 40% solution and contained in a reaction flask equipped with reflux condenser, good agitator and facilities for heating and cooling, is added slowly (over a period of from 3 to 3½ hours) and an alcoholic solution of (2 bromo ethyl) benzene. The temperature during this addition is held to within 40° to 55° C. When the halide has all been added, a short time is allowed to have the reaction mixture come to equilibrium. Heat is then applied slowly to complete the reaction and after about two hours, the condenser is inverted to distil most of the water and ethylene diamine. The free base is obtained by the addition of the exact amount of sodium hydroxide; the reaction product evaporated to dryness under vacuum and the organic reaction product extracted with alcohol.

The free base, having no hydroxyl group may now be reacted with sodium chloroacetate in accordance with known methods to form the triacetic acid derivative. The water solution of the reaction product is acidified to a pH of about 2 and the free tri acid precipitates, while all inorganic salts remain in solution.

The free base as obtained above may also be reacted in accordance with the method described in my patents Nos. 2,387,735 and 2,461,519, using 3 moles of NaCN and 3 moles of $CH_2O$ and by this method the sodium or potassium salts are obtained directly without contamination of halide salts and the product is useful, per se. The alkali metal salts may be obtained by evaporating the so-obtained reaction solution and crystallizing the salts.

The compound has the following structure:

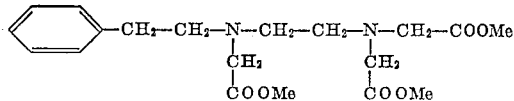

Example III

One mole of 2,4,6 trichlorobenzyl chloride is treated with three moles of diethylenetriamine in aqueous solution by relatively rapid addition of an alcoholic solution of the chloride to a rapidly stirred 50% ethylene diamine solution maintained at room temperature by efficient cooling. The reaction mixture is maintained at room temperature for 3–3½ hours additional. Then gradually heated to complete reaction. Then the excess diethylene triamine is removed by distillation under reduced pressure, and the resulting amine is directly substituted by treatment with three moles of sodium chloroacetate in aqueous solution. (One mole of $Na_2CO_3$ is used to maintain the solution relatively alkaline.)

The sodium chloroacetate treatment is continued for three hours at room temperature and finally completed by heating at reflux for 2 hours more. The product obtained on evaporation of the solvent acidified with HCl is a crystalline material, the formula of which is believed to be:

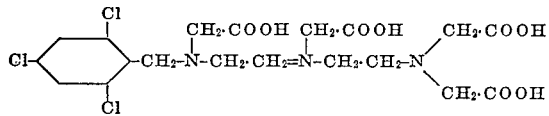

It is obtained admixed with NaCl, but can be separated from this salt by repeated fractional crystallizations from water in which the compound is slightly soluble.

One very important property of these chelating agents is that of forming water-soluble chelates of bivalent metals. The formation of a metal chelate involves two amino groups and two carboxyl groups. The third free carboxyl group forms salts with alkali metals which are water soluble. The acid form of the chelate is usually less soluble and often precipitates from aqueous solution.

The diethylene triamine derivatives and chelating agents of this invention derived from the higher polyalkylene amines, show higher solubility in water as the number of alkylene groups increases. The higher compounds (where $n=3$, 4 and 5) do not precipitate from acidified aqueous solutions.

In the above examples, it is believed apparent that any homologous alkylene diamine may be substituted for ethylene diamine without departure from the invention, such as propylene diamine and trimethylene diamine. Propionic acid groups (and their salts) may be introduced in place of acetic acid groups without departure from this invention in spite of the fact that the stability of the metal chelate is somewhat less than that of the acetic acid compounds. The use of larger acid groups (such as butyric acid groups) produce reagents which have too low affinity for metals to be useful. Any other aliphatic alkylene polyamine also may be substituted for ethylene diamine without departure from the invention to form analogous compounds.

In substitution for R as hereinabove described I may employ alkylene-ether-alkylene chain groups as the divalent spacing R group without departure from the invention and with some solubility advantages and by the term divalent alkylene radical as hereinafter used in the chains, these divalent groups are to be construed as included as equivalent groups.

In the compounds above described it is believed apparent to one skilled in the art that by substituting the phenolic and chlorophenolic groups on the amino nitrogen of the polyamino polyacetic acid compound the formation of phenolate compounds on solution of the substituted amino acid in water or in acid or alkaline pH solutions is effectively avoided with resultant loss in germicidal efficiency. Moreover, it is believed apparent that in these substituted polyamino polyacetic acid compounds there is always at least one acetic acid group for salt formation with basic metal ions to function as a solubilizing group for the compound on chelate reaction of the other acetic acid groups with other metal ions.

For example, in the compounds of Examples I and II two (2) of the carboxymethyl groups are available for chelate reaction and the third carboxymethyl group is a free salt forming group which solubilizes the chelate when and if formed, thereby leaving the phenolic group free to function as a germicide at a solution pH as high as 8.

The compound of Example III having four (4) carboxymethyl groups has two of these groups available for salt formation and accordingly is even more soluble than the compounds of Examples I and II.

In these compounds the sodium salts are the best for water solutions while the potassium salts have a good solubility in polar solvents and the amine salts are quite soluble in organic solvents. These differences in solubility of the salts opens the compounds to a wider field of utility.

Having hereinabove described the present invention generically and specifically and having given several specific examples of the same by way of illustration but not by way of limitation, it is believed apparent that the same may be widely varied or modified without substantial departure from the invention and all such modifications and departures therefrom are contemplated as may fall within the scope of the following claims:

What I claim is:

1. The compound conforming to the formula:

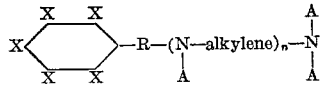

wherein X is one of the group consisting of hydrogen, alkyl, alkoxyl, hydroxyl and halogen with at least one X group but not more than three X groups being halogen; R consists of a di-valent alkylene group of from 1 to 5 carbon atoms; alkylene is one of the group consisting of $CH_2 \cdot CH_2$; $CH_2 \cdot CH_2 \cdot CH_2$; and $CH(CH_3)CH_2$; $n$ is a numeral selected from the group consisting of 1 to 5; and A is one of the group consisting of $CH_2 \cdot COOH$; $CH_2 \cdot CH_2 \cdot COOH$ and the alkali metal, ammonium and amine salts thereof.

2. The mono-substituted aralkyl alkylene polyamino polyacetic compound having the structure:

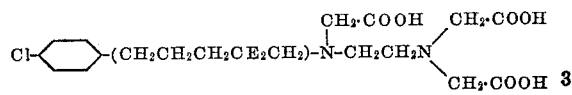

3. The mono-substituted aralkyl alkylene polyamino polyacetic compound having the structure:

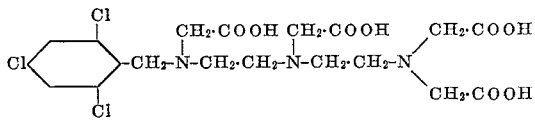

FREDERICK C. BERSWORTH.

REFERENCES CITED

The following references are of record in the file of this patent:

UNITED STATES PATENTS

| Number | Name | Date |
|---|---|---|
| 868,294 | Schmidlin | Oct. 15, 1907 |
| 2,195,974 | Reppe et al. | Apr. 2, 1940 |
| 2,489,363 | Bersworth | Nov. 29, 1949 |

FOREIGN PATENTS

| Number | Country | Date |
|---|---|---|
| 18,095 | Great Britain | of 1913 |
| 642,244 | Germany | Mar. 6, 1937 |

OTHER REFERENCES

Alphen: Chem. Abs., vol. 38, col. 4943 (1944).

Bischoff et al.: Beilstein (Handbuch, 4th ed.), vol. 12, p. 547 (1929).